United States Patent
Torrens et al.

[11] Patent Number: 5,163,642
[45] Date of Patent: Nov. 17, 1992

[54] PIPE SUPPORT BRIDGE

[76] Inventors: Bev Torrens, R.R. 2, Eagle Rock Road, Armstrong, British Columbia V0E 1B0, Canada; Paul Miron, R.R. 2, CP. 17, McLeery Road, Armstrong, British Columbia V0E 1B0, Canada

[21] Appl. No.: 668,381

[22] Filed: Mar. 12, 1991

Related U.S. Application Data

[63] Continuation of Ser. No. 263,535, Oct. 27, 1988, abandoned.

[51] Int. Cl.$^5$ .................................................. F16L 3/00
[52] U.S. Cl. .......................................... 248/49; 248/55; 403/246; 403/254
[58] Field of Search .................... 248/49, 55, 124, 149, 248/676, 671, 670; 138/106, 105; 403/254, 49, 409.1, 246

[56] References Cited

U.S. PATENT DOCUMENTS

| | | | |
|---|---|---|---|
| 735,618 | 8/1903 | Tannewitz | 403/409.1 X |
| 1,225,981 | 5/1919 | Loughridge . | |
| 1,818,961 | 8/1931 | Kramer | 248/49 |
| 2,405,819 | 8/1946 | Dustman | 248/49 |
| 2,709,384 | 6/1954 | Harris . | |
| 2,808,873 | 10/1957 | Snapp, Jr. | 248/49 |
| 2,989,142 | 6/1961 | Gill . | |
| 3,303,937 | 2/1967 | McConnell | 211/187 X |
| 3,494,849 | 2/1970 | Hess | 248/49 X |
| 3,568,455 | 12/1968 | McLaughlin et al. | 248/49 X |
| 3,648,468 | 3/1972 | Bowers | 248/49 X |
| 3,687,406 | 8/1972 | Krahe et al. | 248/55 |
| 3,735,973 | 5/1973 | Petrie . | |
| 3,767,149 | 10/1973 | Hill | 248/49 |
| 3,963,205 | 6/1976 | Hageman | 248/55 |
| 4,128,219 | 12/1978 | Kaigler, Jr. | 248/49 X |
| 4,436,024 | 3/1984 | Arden et al. | 248/124 X |
| 4,709,886 | 12/1987 | Smart et al. | 248/49 |

FOREIGN PATENT DOCUMENTS

| | | | |
|---|---|---|---|
| 414789 | 12/1966 | Switzerland | 248/55 |
| 1417543 | 12/1975 | United Kingdom | 248/49 |

Primary Examiner—Karen J. Chotkowski

[57] ABSTRACT

A pipe support bridge comprising a pair of upstanding support brackets and a central truss member having top and bottom edges and side edges. Each support bracket has a central vertically aligned channel member to slidably receive the side edges of the central channel member such that the central truss members is supported between the support brackets. A locking system comprising pins extending from the sides of the truss member and alignable with holes in the support brackets allows the central truss to be adjusted to different heights in the support brackets. Locating members are mounted to the central truss member for positioning a pipe to be supported atop the pipe support bridge.

15 Claims, 6 Drawing Sheets

PIPE SUPPORT BRIDGE

CROSS-REFERENCE TO RELATED APPLICATIONS

This is a continuation of application Ser. No. 07/263,535, filed Oct. 27, 1988 and now abandoned.

FIELD OF THE INVENTION

This invention relates to a pipe support bridge for carrying pipes.

BACKGROUND OF THE INVENTION

In the construction of pipelines to transport water or other fluids or material, the preferred method often involves burying the pipeline to protect the pipe. Burying the pipeline avoids exposing the pipe to the elements and allows for normal use of the land above the buried line.

Underground pipelines are generally built by digging the necessary trenches to accept the pipeline, assembling sections of the pipeline above ground and then lifting the assembled sections by crane or other suitable means into the prepared trenches. At present, the pipeline sections are often assembled and worked on directly on the ground beside the trench. Obviously, such an arrangement does not provide ideal working conditions and over varied terrain this can lead to major problems with aligning the pipe sections to be assembled. In order to perform the job of putting together pipe sections more efficiently, it is desirable to have temporary pipe supports on which sections of the pipe can be built prior to burying in the ground. Such temporary pipe supports must be capable of securely supporting the weight of a pipeline section as it is constructed. The pipe supports must be placed at intervals along the length of the pipe section under construction such that the pipe is fully supported and does not sag leading to cracks and possible leaks. Additionally, it would be advantageous to have a pipe support stand that is of simple and rugged construction and easily portable so that supports can be moved along the trenches as sections of pipeline are completed and buried in place. A further desirable feature of a temporary pipe support is that it be adjustable to accommodate variations in the terrain beside the trenches.

Prior art devices for holding and supporting pipes are known, however, these devices are generally suitable only as small scale work benches for supporting relatively short lengths of small diameter pipe suitable for indoor plumbing and the like. Examples of such prior art devices include the following U.S. patents:

| |
|---|
| 1,225,981 to Loughridge |
| 3,735,973 to Petrie |
| 2,989,142 to Gill |
| 2,709,383 to Harris |

None of the above patents show an easily adjustable support stand that is specifically designed for supporting pipelines under construction that is able to handle a range of pipe sizes up to the larger diameter pipes that are often used in pipeline construction.

SUMMARY OF THE INVENTION

Therefore, there exists a need for a support structure that can be used when constructing pipelines and that has the desirable features previously mentioned. Accordingly, the apparatus of the present application provides a pipe support structure or bridge that is inexpensive, light weight for easy transport, and adjustable to different heights to accommodate variations in terrain. The present invention is a pipe support bridge comprising:

a pair of upstanding support brackets, each support bracket having a vertically aligned central channel member;

a central truss member having top and bottom edges and side edges, each side edge being slidably received in the central channel member of one of said support brackets such that said central truss members is supported between said support brackets;

locking means to locate said central truss at different heights in said channel members of said support brackets;

pipe locating means mounted to said central truss member for positioning a pipe to be supported atop said pipe support bridge.

In addition to being useful as a pipe support when constructing pipelines, the device of the present application can also be used to support an above ground pipeline. In some circumstances, the cost of burying a pipeline to ensure adequate support and protection cannot be justified. The pipeline may only be temporary of the terrain which the pipeline is to cross is not suitable. The latter situation can occur in northern regions where a pipeline is constructed across permafrost terrain. Permafrost is subsoil remaining below the freezing-point throughout the year in polar regions and it presents certain engineering problems to anyone attempting to build any sort of structure, particularly a pipeline. In many cases, a pipeline will be carrying material that is at a temperature warmer than freezing. By conduction, the heat of this transported material warms the pipeline. If the pipeline were buried under ground, this would result in melting of the permafrost layer thereby destroying the supporting and protecting function of the ground in which the pipeline is buried. As a result, when building pipelines across permafrost terrain, it is necessary to support the line above ground so that the pipeline does not cause melting.

At present, building above ground pipelines often involves having special support structures built and transported to the pipeline site at intervals along the pipeline. Necessarily, if the pipeline is to be supported in an essentially horizontal plane, various supports of different sizes have to be designed and built to accommodate variations in the terrain at the support sites. Designing and building these supports for an above ground pipeline can be very time consuming and expensive. However, the various embodiments of the present invention provide a light weight, inexpensive, transportable and adjustable pipe support bridge that is ideal for use with above ground pipelines.

BRIEF DESCRIPTION OF THE DRAWINGS

Various embodiments of the present invention are shown in the following figures in which.

DESCRIPTION OF THE PREFERRED EMBODIMENTS

Figure 1:
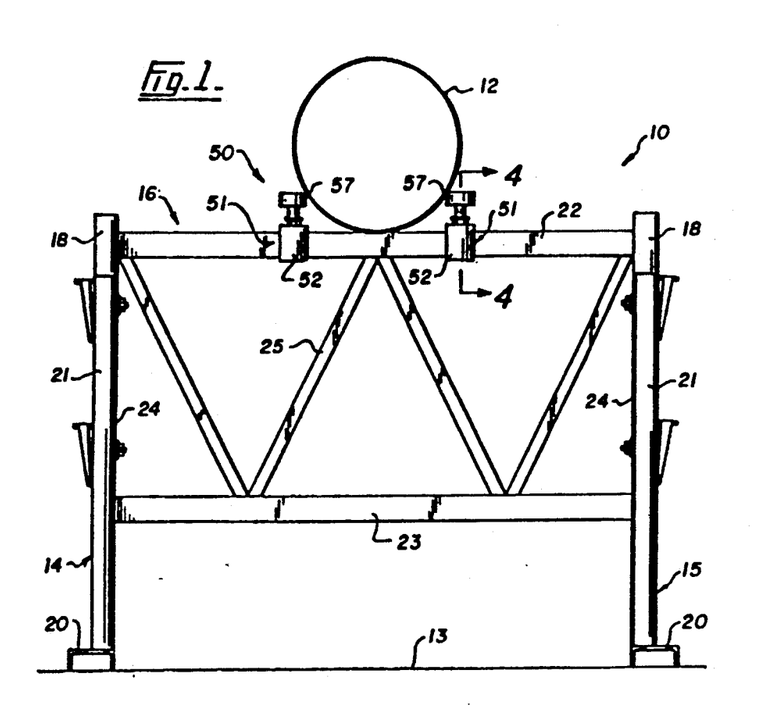
FIG. 1 is a front plan view of a first embodiment of a pipe support bridge built according to the present invention.

Referring to FIG. 1, there is shown a pipe support bridge 10 according to a first embodiment of the present invention supporting a pipe 12 above surface 13.

Figures 3, 4, 5:
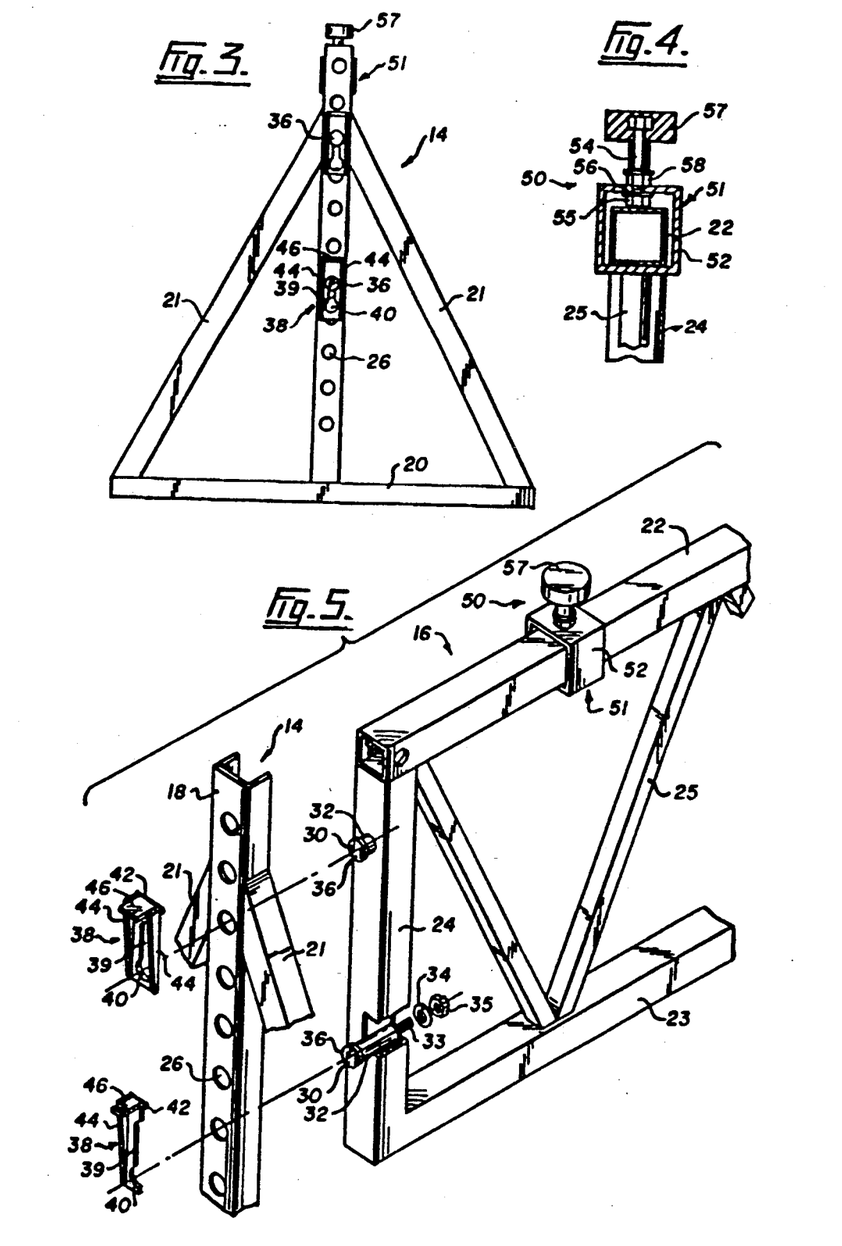
FIG. 3 is a side view of the support bridge of FIG. 1.
FIG. 4 is a section view taken along line 4—4 of FIG. 1 of locating means for positioning a pipe to be supported.
FIG. 5 is an exploded view showing the how the central truss and supports of the present apparatus are assembled in the first embodiment of the present invention.

Pipe support bridge 10 comprises a pair of upstanding support brackets 14 and 15 between which a central truss member 16 is supported. As best shown in FIG. 3, each support bracket 14 or 15 comprises a central vertically aligned channel member 18 mounted on a base member 20 with a pair of bracing members 21 extending between the channel member and the base member on either side.

Figure 2:
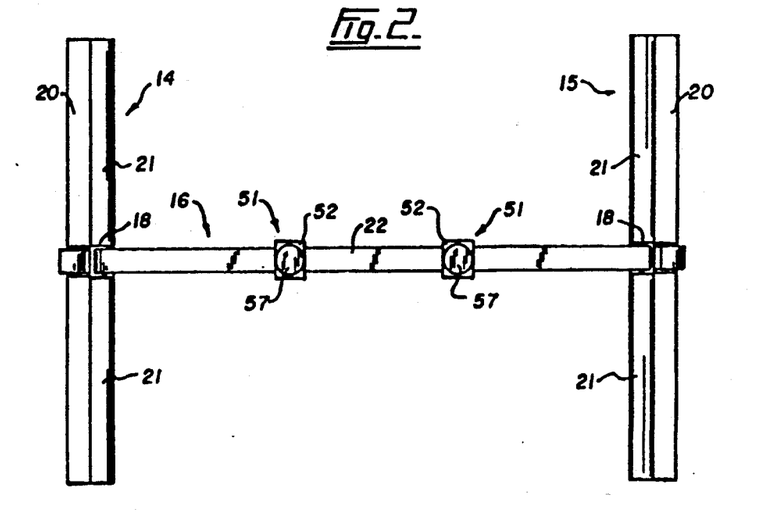
FIG. 2 is a plan view of the support bridge of FIG. 1.

Central truss 16 has a rectangular shape with a perimeter defined by top and bottom members 22 and 23 respectively, with side members 24 extending therebetween. Top member 22 contacts the pipe 12 to be supported. The interior of central truss 16 has bracing members 25 to carry the compression and tension loads generated by the weight of the pipe. FIG. 2 shows how side edges 24 of central truss 16 are adapted for engagement in channel members 18 of the support brackets. Side members 24 can be slid up and down in channel members 18 to raise and lower the central truss thereby providing a pipe support structure that is easily adjustable to different support heights.

The first embodiment of the present invention is also provided with locking means to position central truss 16 at different heights between support brackets 14 and 15. As best shown in FIG. 5, the locking means of the present embodiment comprise a series of openings 26 extending through channel member 18 adapted to accept pins 30 extending from the side edges 24 of central truss 16. Pins 30 are replaceable hard steel pins that are fitted into receiving holes 32 formed in the side edges of the central truss. Each pin has a threaded portion 33 to accept lock washer 34 and nut 35. Tightening nut 35 firmly attaches pin 30 to the truss structure. As shown, it is preferable to have at least two pins extending from side members 24. These pins have stop means in the form of an enlarged head 36 and are insertable through openings 26 to position the central truss member at various heights. In order to properly locate the pin members in a hole, locking plates 38 are provided that fit over the exposed head of each pin to lock the central truss and the support brackets together by preventing the pins from slipping out through openings 26.

Locking plates 38 are formed with a longitudinal opening 39 therethrough. End 40 of the opening is enlarged to fit over pin head 36 and opening 39 is adapted to slide downwardly over the shaft of the pin, as shown in FIG. 3, to position the plate between channel member 18 and pin head 36. Preferably, locking plates 38 are provided with a wedging bar 42 that acts to tightly wedge the locking plate into position between the channel member and the pin head. In addition, the locking plates may be provided with side edges 44 and a cover 46 to protect the pin from the elements. Cover 46 also serves as a striking plate for applying force with a mallet when assembling or taking apart the pipe support bridge of the present invention.

As previously mentioned, top member 22 of central truss member 16 actually has the section of pipe to be supported resting on it. To position the pipe section atop top member 22 pipe locating means 50 are provided comprising a pair of mounting members 51 that are movable along the length of top member 22. In the present embodiment, as best shown in FIG. 4, each mounting member 51 includes means for releasably fixing the transverse position of the mounting members 51 with respect to the central member. This transverse position fixing means comprises a clamping member 52 having an interior into which top member 22 loosely fits. A rotatable threaded shaft 54 extends through a correspondingly threaded opening 56 in the top of clamping member 52. The end of shaft 54 within the interior of the clamping member 52 has attached nut 55. The opposite end of shaft 54 has means to engage the periphery of a pipe in the form of an abutting member having an enlarged head 57 of hard plastic or other suitable material for bearing against the side of a pipe section. Mounting members 51 can be slid along top member 22 to a desired position adjacent a pipe section. Then rotating head 57 will tighten nut 55 against top member 22 raising clamping member 52 for clamping engagement with the top member. Locking nut 58 is provided on shaft 54 to prevent loosening of the clamping member once positioned.

As shown in FIG. 1, clamping members 51 are positioned on either side of a pipe section to prevent the section from moving on the top member 22.

Figure 8:
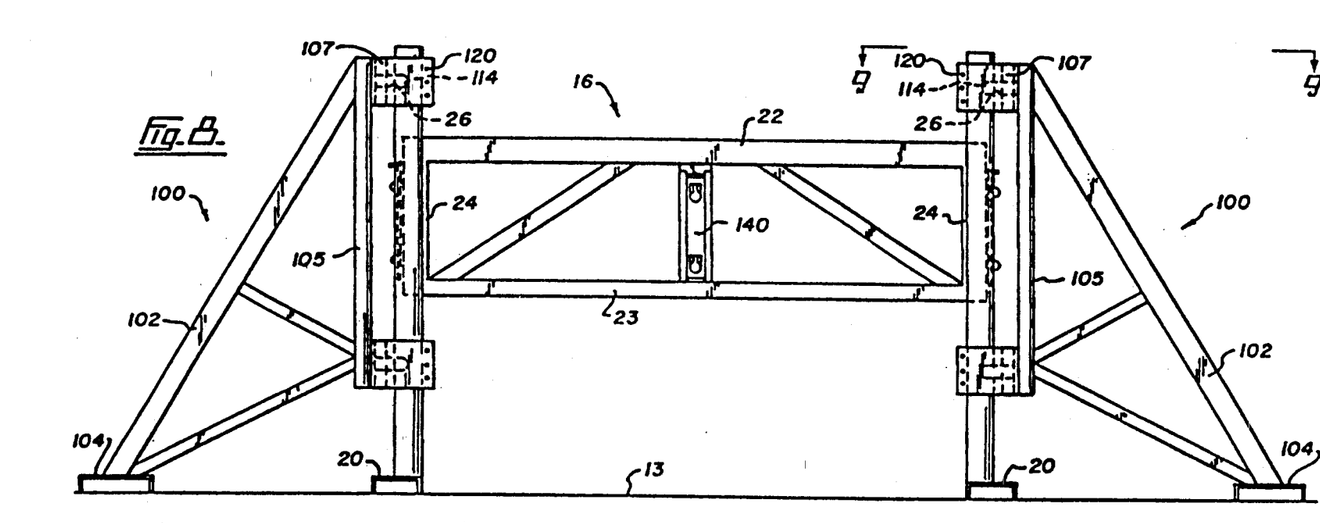
FIG. 8 shows a second embodiment of the present invention being used with an optional side thrust brace.

Turning now to FIG. 8, there is shown a second preferred embodiment of the present invention in which analogous parts to the first embodiment are identically numbered. The second embodiment also comprises a central truss member 16 supported between a pair of support brackets 14 and 15.

Figure 10:
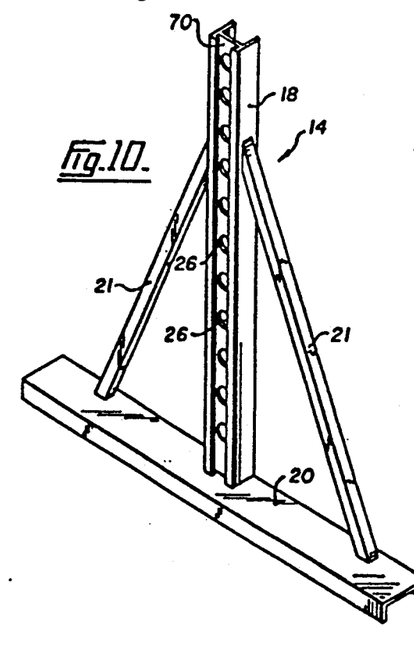
FIG. 10 shows the support bracket of the second embodiment.

As best shown in FIG. 10, each support bracket comprises a central vertically aligned channel member 18 mounted on a base member 20 with a pair of bracing members 21 extending between the channel member and the base member on either side. In this second embodiment, the outer edge of the channel member 18 is formed with a guide channel 70 adapted to accept a locking plate of the locking means of the present invention.

Figure 12:
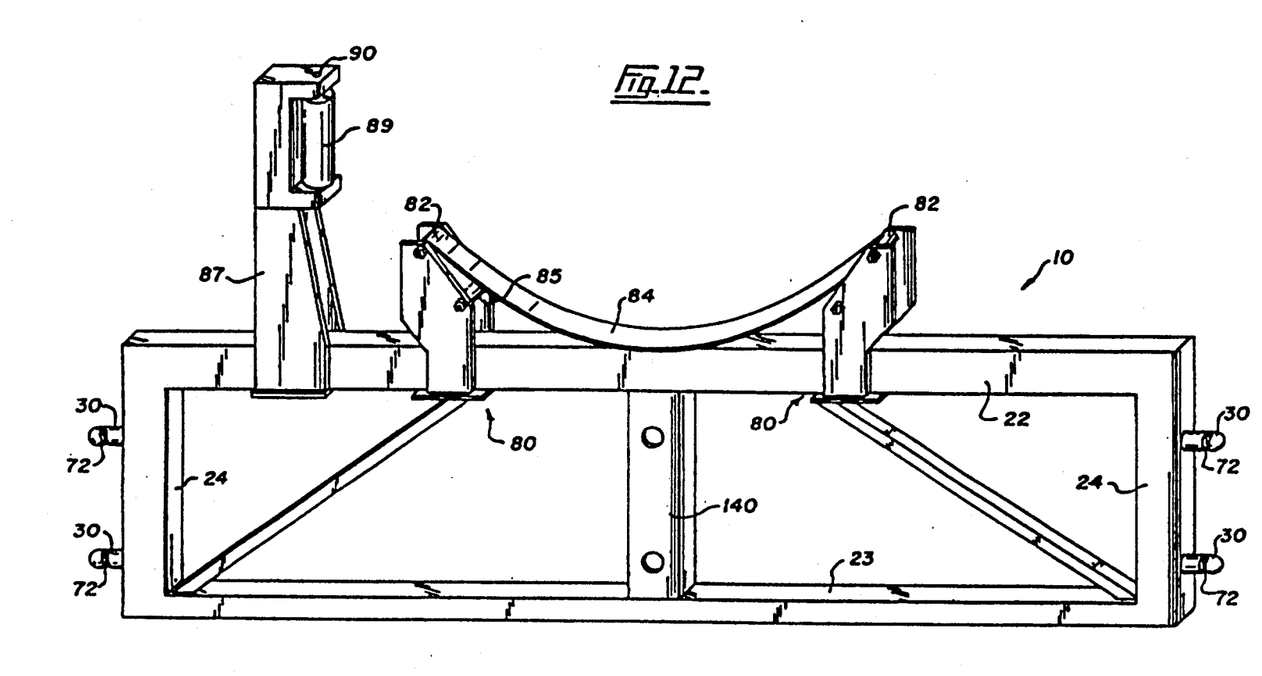
FIG. 12 is a view of a central truss member constructed according to the second embodiment.

The second embodiment of the present invention uses a modified central truss member 16 that has shorter side edges 24 that the central truss of the first embodiment. Referring to FIG. 12, the locking means of the second embodiment includes pins 30 extending from the side edges and adapted to be inserted into openings 26 extending through channel member 18. Pins 30 are attached to the central truss member in an identical manner as the pins of the first embodiment. Each pin is formed with stop means comprising a pair of slots 72 on opposite sides to define a narrowed neck. In a manner similar to the first embodiment, the pins are insertable through openings 26 to position the central truss member at various heights. Locking plates 38 fit into the slots in each pin to lock the central truss and the support brackets together. Preferably, the pins are provided with slots that narrow downwardly to provide a wedge fit for the locking plate.

Figure 11:
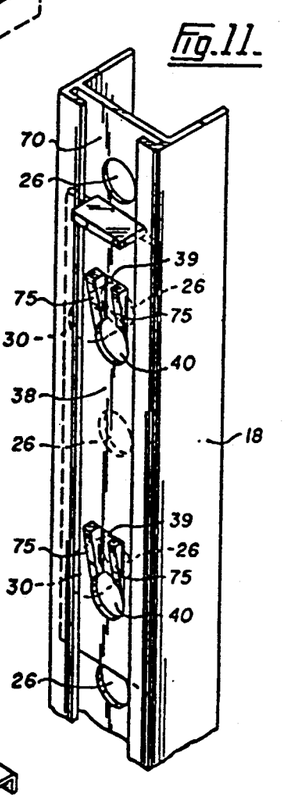
FIG. 11 is a detailed view of a locking plate according to the second embodiment of the present invention.

In the second embodiment, a single locking plate 38 can be used to anchor a pair of pins. As shown in FIG. 11, each locking plate is formed with two openings 39 therethrough having enlarged end portions 40 to allow the plate to be fitted over the pins. The locking plate is slid down guide channel 70 for positioning over the pins. The shorter side edges 24 of the central truss of the second embodiment ensure that pins 30 are closer together thereby allowing a single plate to lock both pins. Obviously, if desired a single locking plate could be used for each pin as occurs with the first embodiment. Note also that each locking plate is provided with ramped surfaces 75 adjacent each side of openings 39 to provide a wedge action for tightly interlocking the locking plates and pins 30.

FIG. 12 shows the locating means of the second embodiment comprising a pair of spaced mounting members 80 attached to the top member 22. Each mounting member 80 includes a suspension member 82 for the attachment of means to engage the periphery of a pipe in the form of a flexible belt 84. Belt 84 is attached such that the belt extends between the two mounting members 80 to allow for suspension of a pipe member being worked on. Preferably, as shown, supports 80 also include members 85 below each suspension member 82 on which belt 84 can rest to assist in supporting the weight of a suspended pipe. It is desirable that flexible belt 84 be made from an insulating material such that the pipeline under construction never makes contact with steel structure of the pipe bridge thereby insulating the pipeline from electrical contact.

The pipe locating means in FIG. 12 can also include additional upstanding bracing supports 87 movably mounted to the top member 22 of the central truss member adjacent each mounting member 80. The upstanding bracing supports are adjustable in height and include a bearing member 89 rotatably mounted on axle 90. The bearing member is adjustable to engage a large supported pipe at opposite ends of the pipe diameter to assist in steadying the pipe.

Figure 9:
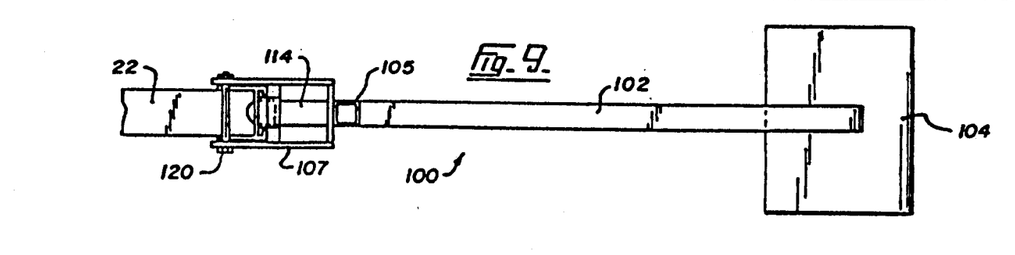
FIG. 9 is a detailed view of the optional side thrust brace.

Referring to FIG. 8, the pipe support bridge of the second embodiment includes a side thrust brace 100 which can be releasably attached to one of the support brackets 14 or 15 to absorb lateral forces exerted on the support bracket as for example would occur when the pipe bridge is constructed on slightly sloping ground. The side thrust brace comprises a leg member 102 with an attached foot pad 104. Leg member 102 is attached by conventional bracing members to mounting post 105 from which mounting brackets 107 extend FIG. 9 provides a detailed view of mounting bracket 107 that comprises a pair of spaced side plates 110 that extend from an end plate 112 mounted to mounting post 105. A central pin 114 extends between side plates 110 from end plate 112. Central pin 114 fits into openings 26 formed in vertically aligned channel member 18 of the support bracket while side plates 110 straddle the member 18. A plurality of bolts 120 extend between the ends of side plates 110 and are used to tighten the side plates against channel member 18 of the support bracket to locate the side thrust brace on the support bracket. A bearing plate 122 having a hole 124 through which pin 114 extends is located between the side plates 110.

While the side thrust brace is shown in place on the second embodiment of the present invention, it is understood that the brace can also be used on the first embodiment.

In use, due to their light-weight and collapsible nature, the various embodiments of the apparatus of the present invention are easily transportable to a work site for supporting an above ground pipeline or a pipeline being assembled for subsequent burying. The pipe support bridge is assembled and adjusted to the desired support height for the particular section of pipeline.

Figure 6:
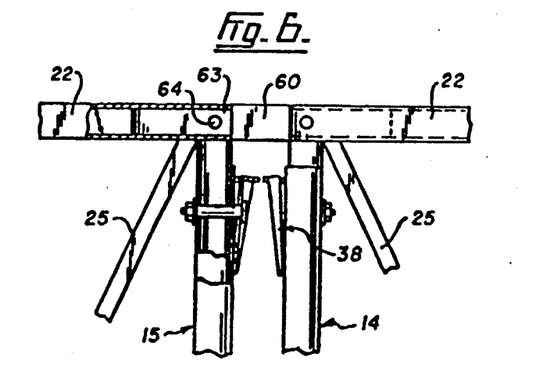
FIG. 6 shows the use of an extension member for connecting two pipe support bridges together.

In some situations, as in the case of two parallel pipelines, it may be desirable to locate two pipe support bridges side by side. FIG. 6 shows an extension member 60 that can be used to link two pipe support bridges together comprising a longitudinal member 60 that is fitted within the open ends 63 of the tubular member used to form top member 22 of the central truss member. Both the extension member and the top member are formed with alignable holes 64 through which a pin is slotted to lock the extension member and the joined pipe support bridges together.

Figure 13:
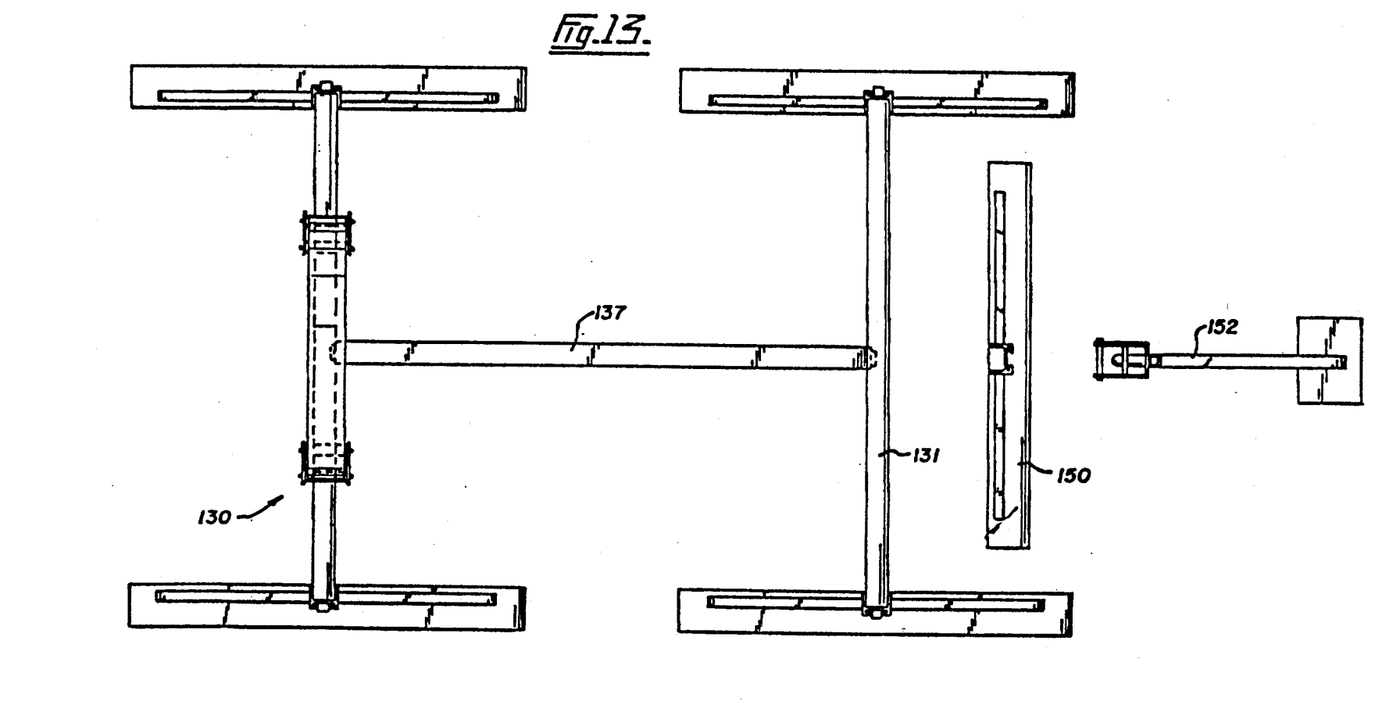
FIG. 13 is a plan view showing how the support bridges of the second embodiment can be interconnected.

Alternatively, instead of being connected together using longitudinal member 60, the pipe support bridge of the second embodiment of the present invention can be interconnected in a variety of ways as shown in FIG. 13 in order to support particularly heavy loads on uneven terrain. In FIG. 13, a pair of pipe support bridges 130 and 131 constructed according to the second embodiment are joined together by a central truss member 137 that extends between the pipe support bridges 130 and 131. As best shown in FIG. 12, each central truss member is formed with interconnecting means including an interconnecting member 140 centrally located within the bracing system of a first truss and extending between the top and bottom members. The interconnecting member 140 is a channelled member capable of accepting a locking plate and having a plurality of openings designed to accept the pins of a second truss member such that the second truss extends at right angles to the first truss. A locking plate is used to lock the pins in place in an identical manner to the system used to lock a central truss member to the channel member 18 of a support bracket. Instead of using central truss member 137 to connect together a pair of pipe support bridges, truss member 137 can connect truss 130 to a bracket support 150 which, in turn, could be joined to a side thrust brace 152. Obviously, the locking means of the present invention with its system of pins and locking plates allows for a wide variety of interconnections between the component parts of the structure.

Figure 7:
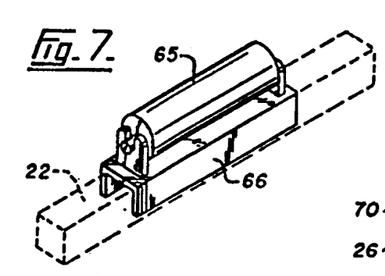
FIG. 7 shows a pipe roller attachment for use with the pipe support bridge.

A further component for use with the present invention is shown in FIG. 7. The pipe support bridge provides a useful work platform for cutting and preparing pipe section during construction of a pipeline and FIG. 7 shows an attachment useful for supporting a pipe section that allows easy manipulation of the pipe. The attachment comprises a roller 65 mounted to a straddling attachment 66 for placement atop top member 22 shown in dashed lines. Roller 65 supports a pipe section and allows the pipe to be more easily handled and maneuvered as, for example, when moving the pipe forward to cut off sections.

The various embodiments of the pipe support bridge of the present invention are preferably constructed from conventional square metal tubing or channel iron that is welded together to provide a sturdy but light weight structure. An assembled prototype of the present invention built with 2×2 inch square tubing and 2.25×2.25×0.25 inch channel iron and having a central truss with a length of 48 inches weighed only 55 pounds and was capable of supporting a static design force of 24,000 pounds.

Although the present invention has been described in some detail by way of example for purposes of clarity and understanding, it will be apparent that certain changes and modifications may be practised within the scope of the appended claims.

We claim:

1. A pipe support bridge comprising:
a pair of upstanding support brackets, each support bracket having a vertically aligned central channel member;
a central truss member having top and bottom edges and side edges, each side edge being slidably received in the central channel member of one of said support brackets such that said central truss members is supported between said support brackets;
locking means to locate said central truss at different heights in said channel members of said support brackets;
pipe locating means mounted to said central truss member for positioning a pipe to be supported on top of said pipe support bridge and comprising a pair of mounting members on the top edge of said central truss member having means for releasably fixing the mounting members in a transverse position with respect to said central truss member and associated means for engaging a portion of the periphery of the pipe to stabilize the pipe and fix the pipe in the transverse position with respect to said central truss member in response to engagement of said means for releasably fixing the mounting members.

2. A pipe support bridge as claimed in claim 1 in which said locking means comprises:
a plurality of spaced openings in said vertically aligned channel members;
at least two pins extending outwardly from each side edge of said central truss member, said pins having stop means and being alignable with and adapted for insertion through selected openings in said channel members such that said stop means are exposed on the opposite side of said channel members; and
a locking plate for fitting over the exposed ends of said pins and engaging said stop means to lock said central truss and said support brackets together by preventing said pins from exiting through said openings.

3. A pipe support bridge as claimed in claim 2 in which said stop means of said pin comprises an enlarged head.

4. A pipe support bridge as claimed in claim 2 in which said stop means comprises a pair of slots cut in opposite sides of said pin to define a neck on said pin.

5. A pipe support bridge as claimed in claim 4 in which said slots narrows downwardly.

6. A pipe support bridge as claimed in claim 2 in which said locking plate is formed with at least one channel therethrough dimensioned to allow for slidable movement of said locking plate perpendicular to the longitudinal axis of said pin, said stop means of said pin preventing movement of said lock plate axially of said pin, said channel having an enlarged end portion adapted to fit over said stop means to allow said locking plate to be fitted over said pin.

7. A pipe support bridge as claimed in claim 6 in which said locking plate includes wedging means to tightly position said locking plate between said stop means and said channel member of said support bracket.

8. A pipe support bridge as claimed in claim 7 in which said wedging means comprises ramped surfaces adjacent the edges of said channel of said locking plate.

9. A pipe support bridge as claimed in claim 2 in which said vertically aligned channel member is formed with a guide channel to accept said locking plate.

10. A pipe support bridge as claimed in claim 1 in which said means for releasably fixing the mounting members in the transverse position comprises a pair of clamping members movable along the top edge of said central truss member and adapted for releasably clamping said top edge.

11. A pipe support bridge as claimed in claim 1 including a pipe roller support comprising a rotatable roller mounted to an attachment member adapted for mounting on said top edge of said central truss member.

12. A pipe support bridge as claimed in claim 1 in which said means for engaging a portion of the periphery of the pipe comprises:
flexible belts extending between said mounting members to support the lower periphery of said pipe.

13. A pipe support bridge as claimed in claim 1 including an side thrust brace removably mountable to said vertically aligned central member of said support bracket to absorb lateral forces on said bracket.

14. A pipe support bridge as claimed in claim 1 in which said central truss member has interconnecting means for perpendicular connection of a first central truss members to a second central truss members comprising:
an interconnecting member extending between the top and bottom edges of said first central truss member with a plurality of spaced openings in said interconnecting member;
at least two pins extending outwardly from a side edge of said second central truss member, said pins having stop means and being alignable with and adapted for insertion through selected openings in said interconnecting member such that said stop means are exposed on the opposite side of said interconnecting member; and
a locking plate for fitting over the exposed ends of said pins and engaging said stop means to lock said first central truss member and said second central truss member together at right angles by preventing said pins from exiting through said openings.

15. A pipe support bridge as claimed in claim 1 in which said means to engage a portion of the periphery of the pipe comprises abutting members for engagement with opposite sides of a supported pipe to stabilize the pipe atop said central truss member.

* * * * *